United States Patent [19]

Loskot

[11] 4,269,031

[45] May 26, 1981

[54] HEAT ENGINE

[76] Inventor: John E. Loskot, Death Valley Star Route, Baker, Calif. 92309

[21] Appl. No.: 16,836

[22] Filed: Mar. 2, 1979

[51] Int. Cl.³ .............................................. F01K 11/04
[52] U.S. Cl. ....................................... 60/669; 60/682; 60/530
[58] Field of Search ................. 60/650, 682, 669, 530

[56] References Cited

U.S. PATENT DOCUMENTS

| 2,597,249 | 5/1952 | Kollsman | 60/682 |
| 3,375,664 | 4/1968 | Wells, Jr. | 60/682 X |
| 4,022,024 | 5/1977 | Abeles | 60/650 X |
| 4,157,014 | 6/1979 | Clark | 60/682 X |

*Primary Examiner*—Allen M. Ostrager
*Attorney, Agent, or Firm*—Lyon & Lyon

[57] ABSTRACT

A thermal engine employing a temperature differential to move a constant recycling fluid through a turbine. The density differential in the fluid caused by variation in temperature is used to power a turbine. The device is rotated to increase the relative difference between densities in the fluid. The engine is compactly arranged with a centrally located turbine surrounded by a heat transfer mechanism including heat transfer elements extending through the walls of the several cavities employed. A number of individual fluid cycles may be employed to increase the efficiency of the mechanism.

8 Claims, 3 Drawing Figures

HEAT ENGINE

BACKGROUND OF THE INVENTION

The present invention is in the field of heat engines and is specifically directed to a device employing a temperature differential to create a variation in the density of the driving fluid. This fluid in turn drives the turbine.

The fundamental concept of heating a gas, using the increased energy of that gas to perform useful work and then recycling the gas for repeated use thereof has been known for many years. Two examples of such concepts are embodied in the Steriling and the Ericsson cycles. From these fundamental concepts, an almost unlimited number of devices and variations on devices have been developed to in one way or another turn the enrgy obtainable from a closed heat cycle into mechanical output. One such device worthy of mention in the present context is the disclosed in U.S. Pat. No. 2,597,249 to Paul Kollsman. This device employs a recycling gas subjected to a temperature differential across the mechanism. The entire mechanism functions much like a turbine with cooled gases passing outwardly on one side of the turbine and the heated gases passing inwardly on the other side of the turbine. As the heated gases move toward the axis, the change in angular momentum applies rotational energy to the engine. Another device using a liquid as the circulating fluid is disclosed in U.S. Pat. No. 4,022,024, to Abeles. This device employs gravity to operate on the variations in density of the recirculating liquid and employs a separate turbine to take off mechanical energy. The conventional recirculating fluid devices employing variable densities of the fluid as the driving force have been found to be relatively inefficient as is stated in the Abeles patent. Both the Kollsman and Abeles patents are directed to improvement in the efficiency of such systems.

SUMMARY OF THE INVENTION

The present invention is directed to a mechanism employing a recycling fluid which is subjected to differential heating and cooling to provide mechanical energy. The device employs the variation in density of the fluid to drive the fluid through a turbine. Centrifugal forces are employed to drive the fluid. A plurality of fluid cycles employed in a heat cascade act to increase the overall efficiency of the system.

The structure of the present invention has been devised to enhance the overall efficiency of the heat engine. To this end, a central turbine is provided, a heat cascade is employed in one preferred embodiment and heat transfer devices within the system are used to enhance the flow of heat. Low temperature helium is also recommended as the fluid.

Accordingly, it is an object of the present invention to provide an efficient recycling fluid heat engine. Other and further objects and advantages will appear hereinafter.

DETAILED DESCRIPTION OF THE PREFERRED EMBODIMENT

Figure 1:
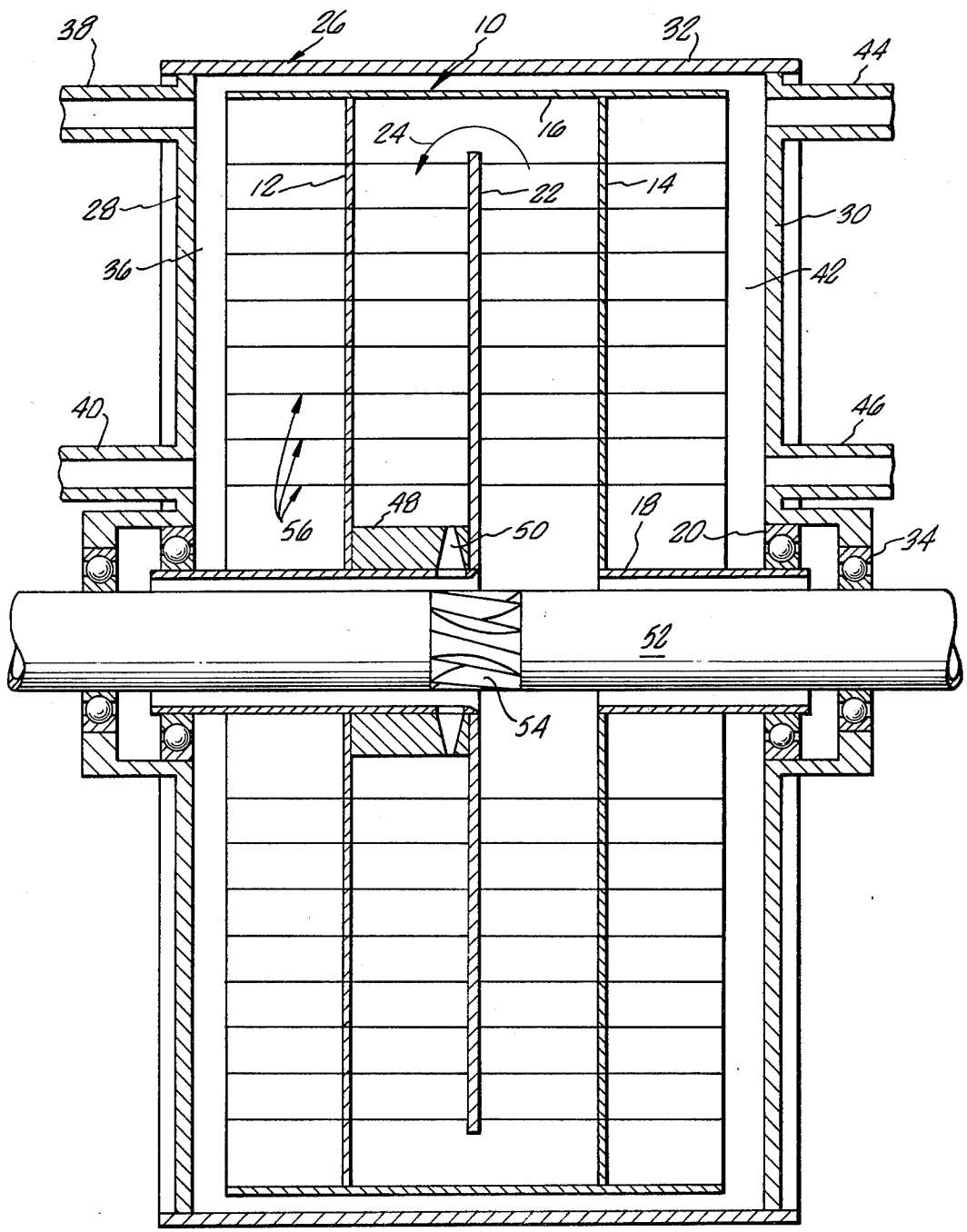
FIG. 1 is a schematic in elevation illustrating the enclosing structure, heat transfer devices and the circulation of heated and cooled fluids which provide the differential temperatures to the unit.

Turning first to FIG. 1, the underlying principle of movement of the gases in the present invention is illustrated. A cylindrical container 10 is schematically illustrated as having circular panels 12 and 14 and an annular panel 16. Drive shaft means 18 are rotatably mounted in bearings 20. A central partition 22 extends radially outwardly from a central location near the axis of the drive shaft means 18. The partition 22 does not extend all the way to the annular panel 16 such that fluids, as indicated by arrows 24, can circulate as shown.

Centrifugal forces are created in the fluid by rotation of the cylindrical container 10. A cooling fluid is presented to the right side of the container 10 against circular panel 14. Similarly, a heating fluid is presented to the opposite panel 12. The temperature differential experienced by the body of gas contained within the cylindrical container 10 creates a variation in density within the fluid, making the fluid on the right side of the partition 22 denser than that on the left side of the partition 22. Because of the rotation of the container 10, the centrifugal force developed in the denser fluid on the right side of the partition 22 is greater than that developed on the left side. Consequently, a toroidal flow is developed as indicated by arrows 24.

Turning to the greater detail of FIG. 1, provision is shown for the heating and cooling fluids in the system. Specifically, a housing 26 is generally illustrated as also being substantially cylindrical with sidewalls 28 and 30 and a cylindrical wall 32 about the periphery thereof. The housing 26 is most conveniently fixed so as not to rotate. As can be seen in this figure, both the drive shaft means 18 and an inner output shaft can be physically mounted to rotate relative to the housing 26 on bearings 20 and 34.

FIG. 1 illustrates an embodiment using a single body of recirculating fluid. The circulating fluid is contained within the cylindrical container 10 which is centrally located within the housing 26. The central location of the housing 26 defines not only the enclosed cavity wherein the recirculating fluid is contained, but also defines cavities on either side of the container. The cavity 36 to the left of the container 10 is employed in combination with inlet 38 and outlet 40 to define a hot circulation means. Fluid at a temperature above that of the recirculating fluid within the container 10 is introduced through inlet 38 and is extracted at outlet 40. As the fluid is circulating in the cavity 36, heat is transferred from that fluid through the circular panel 12 to the recirculating fluid within the container 10. At the same time, the cavity 42 located to the right of the container 10 and the inlet 44 and outlet 46 define a cold circulation means. The flow of fluid through the cavity 42 is kept at a temperature below that of the recirculating fluid within the container 10. Heat is thus transferred from the recirculating fluid in the container 10 to the fluid passing through the cold circulation means.

Because of the introduction of relatively hot fluid into the first cavity 36 and the introduction of relatively cold fluid into the second cavity 42, and because of the rotation of the container 10, the denser fluid within the container 10 is present on the right side of the central partition 22 and moves outwardly as the less dense fluid on the left side of the partition 22 moves inwardly. Without any means for the fluid to circulate between the left side of partition 22 and the right side of partition 22 about the inner edge of the partition, a pressure differential will build up. The pressure on the left side of the panel 22 will be higher than the pressure on the right side of the same panel taken at any pair of points equidistant from the central axis of the device. Naturally, as the heat differential is increased between the fluid on either side of the partition 22, the differential pressure will increase.

To utilize this pressure differential across the partition 22, a cylindrical closure member extends about the inner periphery of the container 10 between the circular panel 12 and the partition 22. This closure member 48 prevents the flow of recirculating fluid toward the axis of the device. However, nozzles 50 extend through the circular closure member 48 such that conditioned fluid can in fact pass inwardly toward the axis of the device. Naturally, the nozzles are so configured and arranged to provide optimum flow as conventionally determined using standard turbine technology.

Inwardly of the container 10, an output shaft 52 is shown to be concentrically mounted relative to the container. This output shaft 52 includes a turbine 54 that is positioned to receive the flow of recirculating fluid from the container 10 and nozzles 50 for optimum power transfer from the fluid to the shaft 52. Again, conventional turbine technology may here be employed to provide the best configuration for optimum results. The thrust of the recirculating fluid through the nozzles 50 will tend to move the container 10 in a first rotational direction while the output shaft 52 and associated turbine 54 will tend to move in the opposite direction. Thus, a drive mechanism is provided for both the container 10 and the output shaft 52. The fluid passing through the turbine 54 is passed onto the right side of the partition 22 where they are cooled to again power more fluid through the nozzles 50.

Figure 2:
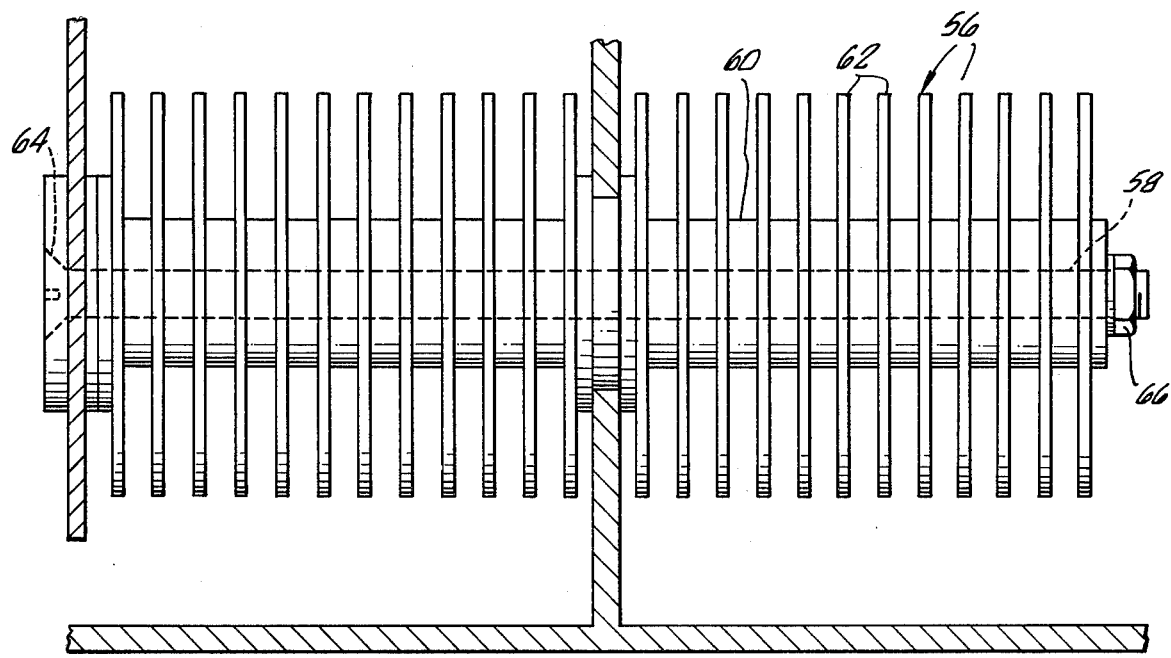
FIG. 2 is a detailed elevation of a heat transfer element contemplated for employment with the present invention.

Schematically illustrated in FIG. 1 and illustrated in greater detail in FIG. 2 are heat exchange elements 56. The heat exchange elements 56 are designed to provide maximum heat transfer across the circular panels 12 and 14. To this end, a central shaft 58 is employed through either of the circular fins 62. The spacers 60 and fins 62 are placed in an alternating arrangement to define the structure best seen in FIG. 2. The shaft 58 may include a head 64 at a first end thereof and is threaded at the other end. A nut 66 may then be used to hold the assembly together and in slight compression for maximum heat transfer between elements. As schematically illustrated in FIG. 1 a large number of such heat exchange elements 56 may be employed.

Figure 3:
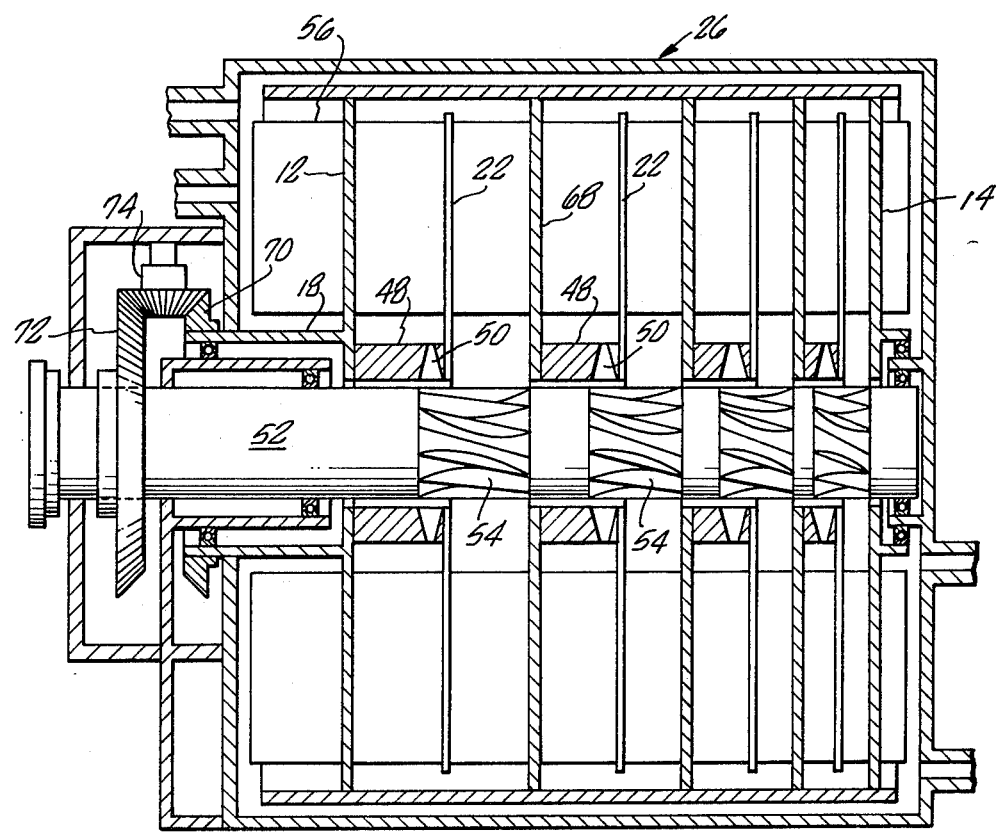
FIG. 3 is a heat engine of the present invention shown in a cross-sectional elevation and schematically illustrating the use of a temperature cascade.

Looking to FIG. 3, a thermal cascade is illustrated. Furthermore, the association between the drive shaft means 18 and the output shaft 52 is illustrated. Multiple recycling fluid paths are used with each succeeding path providing a heat source or sink for its adjacent system. The original circular panels 12 and 14 and annular panel 16 remain. However, intermediate circular panels 68 are employed to divide the container 10 into multiple cavities. Similarly, additional partitions 22 are employed as well as closure members 48 and nozzles 50. The output shaft 52 employs additional turbines 54 in association with the additional nozzles as can best be seen in the drawing. Heat exchange elements 56 are also employed across each intermediate circular panel 68.

The use of temperature cascade enhances the thermal recovery of such a system. The present system contemplates the use of helium as a working fluid. This fluid may be operated at a very low temperature to reduce the amount of rejected heat energy not used by the system. With the use of a temperature entropy diagram or helium, it can be seen that at a temperature of 11° kelvin the gas at 1 atmosphere pressure has an available energy close to 0.8 calories per kilogram and the rejected energy is close to 1.6 calories per kilogram. At about 4° kelvin, the available heat energy remains constant at about 0.8 calories per kilogram while the rejected heat energy falls to practically nothing except for friction losses and turbine inefficiencies.

By using the temperature cascade, a great deal of that rejected heat energy can be reclaimed. As an example and ignoring friction for the purposes of illustration, a 100 calories heat input at 10° kelvin will result in a mechanical energy output of $33\frac{1}{3}$ calories and a rejected heat of $66\frac{2}{3}$ calories. The second recycling fluid system would convert 24 calories and reject $42\frac{2}{3}$ calories. At this point, the fluid is at 8° kelvin. The next cycle will convert an additional 16.8 calories and reject 25.8 calories with seven such recycling fluid systems, the temperature of the fluids will range from 10° kelvin to approximately 5° kelvin and of the 100 calorie input, only a theoretical 1.2 calories remain as rejected heat energy.

A mechanical connection is illustrated between the output shaft 52 and the drive shaft means 18 in FIG. 5. This includes a first bevel gear 70 associated with the drive shaft means 18, a second bevel gear 72 associated with the output shaft 52 and a pinion 74 fixed to the housing 26. Thus, the output shaft 52 rotates in a different direction from container 10.

Thus, an efficient heat engine is disclosed by the present invention. While embodiments and applications of this invention have been shown and described, it would be apparent to those skilled in the art that many more modifications are possible without departing from the inventive concepts herein described. The invention, therefore, is not to be restricted except by the spirit the appended claims.

What is claimed is:

1. A heat engine comprising
   a housing;
   an output shaft rotatably mounted centrally through said housing;
   a container including container drive shaft means rotatably mounting said container in said housing concentrically about said output shaft, first and second circular panels radially extending from said container drive shaft means, and an annular panel mounted to the peripheries of said first and second circular panels, said container being centrally located in said housing to divide same into a first cavity adjacent a first end of said housing, a second cavity adjacent a second end of said housing and the enclosure of said container;
   a partition within and fixed to rotate with said container and radially extending from adjacent said output shaft, said partition permitting flow around said partition adjacent said annular panel;
   hot circulation means in said housing to circulate hot fluid through said first cavity;

cold circulation means in said housing to circulate cold fluid through said second cavity;

a closure member extending from said first panel to said partition adjacent said output shaft to prevent flow from said container toward said output shaft between said first panel and said partition;

a nozzle through said closure member to direct conditioned flow from said container toward said output shaft; and a turbine fixed to said output shaft and aligned with said nozzle to be driven by flow through said nozzle.

2. Heat engine of claim 1 wherein said container further includes heat exchange elements extending through said first and second circular panels to enhance heat transfer across said circular panels.

3. The heat engine of claim 1 wherein at least one additional circular panel is positioned in said container between said first and second circular panels and at least one additional partition, closure member and nozzle being positioned within said container, said partitions radially dividing each enclosure between said circular panels.

4. The heat engine of claim 1 wherein said container drive shaft means includes axially extending hollow tubular members.

5. The heat engine of claim 1 wherein said hot circulation means includes an inlet and an outlet to said first cavity and said cold circulation means includes an inlet and an outlet to said second cavity.

6. The heat engine of claim 1 wherein said closure member includes a cylindrical member coaxially arranged with said output shaft.

7. The heat engine of claim 2 wherein said heat exchange elements include composite cylindrical structures extending normally to the plane of the associated said circular panel and having circular fins extending radially outwardly from said cylindrical structures.

8. The heat engine of claim 1 further including helium as the working fluid.

* * * * *